United States Patent
Iwai et al.

(10) Patent No.: US 10,061,377 B2
(45) Date of Patent: Aug. 28, 2018

(54) MEMORY DEVICE AND INFORMATION PROCESSING DEVICE

(71) Applicant: Toshiba Memory Corporation, Minato-ku (JP)

(72) Inventors: Daisuke Iwai, Yokohama (JP); Hiroshi Yao, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 5 days.

(21) Appl. No.: 14/842,014

(22) Filed: Sep. 1, 2015

(65) Prior Publication Data
US 2016/0231803 A1    Aug. 11, 2016

Related U.S. Application Data

(60) Provisional application No. 62/113,074, filed on Feb. 6, 2015.

(51) Int. Cl.
*G06F 1/32* (2006.01)
*G06F 1/26* (2006.01)
*G06F 1/00* (2006.01)

(52) U.S. Cl.
CPC .......... *G06F 1/3275* (2013.01); *G06F 1/3287* (2013.01); *G06F 1/3237* (2013.01); *Y02D 10/13* (2018.01); *Y02D 10/14* (2018.01); *Y02D 10/171* (2018.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 7,971,081 B2 | 6/2011 | Cooper et al. | |
| 8,473,760 B2 | 6/2013 | Takeyama et al. | |
| 9,727,473 B2 * | 8/2017 | Dees | G06F 12/0868 |
| 2006/0136758 A1 * | 6/2006 | Yoon | G11C 5/147 |
| | | | 713/300 |
| 2007/0106930 A1 * | 5/2007 | Imai | G06F 17/30011 |
| | | | 715/205 |
| 2009/0019301 A1 * | 1/2009 | Minami | G06F 1/3221 |
| | | | 713/324 |
| 2010/0058087 A1 * | 3/2010 | Borras | G06F 1/3203 |
| | | | 713/322 |

(Continued)

FOREIGN PATENT DOCUMENTS

| | | |
|---|---|---|
| JP | 2010-152853 | 7/2010 |
| JP | 2011-508341 | 3/2011 |
| JP | 2011-192212 | 9/2011 |

*Primary Examiner* — Phil Nguyen
(74) *Attorney, Agent, or Firm* — Oblon, McClelland, Maier & Neustadt, L.L.P.

(57) ABSTRACT

According to one embodiment, when shifting to a sleep mode, a processor of a memory device transmits a first command and saving data to a host and issues a power shut-off request. The first command is a command for writing data to a first memory of the host. The saving data includes register information. The register information includes register data stored in the control register and an address of the control register. A power supply circuit shuts off power supply to a second memory of the memory device, the control register, the processor, and a peripheral circuit in response to the issued power shut-off request.

16 Claims, 7 Drawing Sheets

(56) References Cited

U.S. PATENT DOCUMENTS

| | | | |
|---|---|---|---|
| 2010/0169687 A1* | 7/2010 | Kimura | G06F 1/3221 |
| | | | 713/324 |
| 2010/0211513 A1* | 8/2010 | Yoshida | G06Q 30/018 |
| | | | 705/317 |
| 2010/0312947 A1* | 12/2010 | Luukkainen | G06F 12/0223 |
| | | | 711/103 |
| 2011/0060867 A1* | 3/2011 | Jung | G06F 3/0605 |
| | | | 711/103 |
| 2011/0296088 A1* | 12/2011 | Duzly | G06F 12/0246 |
| | | | 711/103 |
| 2014/0118765 A1* | 5/2014 | Yang | G03G 15/5004 |
| | | | 358/1.13 |
| 2014/0173171 A1* | 6/2014 | Chen | G06F 9/4406 |
| | | | 711/102 |
| 2014/0226400 A1* | 8/2014 | Kimura | G06F 1/3225 |
| | | | 365/185.08 |
| 2015/0124279 A1* | 5/2015 | Iizuka | G06K 15/4055 |
| | | | 358/1.14 |
| 2015/0363425 A1* | 12/2015 | Li | G06F 12/0246 |
| | | | 707/690 |

* cited by examiner

MEMORY DEVICE AND INFORMATION PROCESSING DEVICE

CROSS-REFERENCE TO RELATED APPLICATIONS

This application is based upon and claims the benefit of priority from U.S. Provisional Application No. 62/113,074, filed on Feb. 6, 2015; the entire contents of which are incorporated herein by reference.

FIELD

An embodiment described herein relates generally to a memory device having a non-volatile memory and an information processing device.

BACKGROUND

As a memory architecture of an information processing device, a UMA (Unified Memory Architecture) is known. The UMA is a memory architecture in which a host and a device share and use a memory mounted in the host.

When shifting to a sleep mode as a low power consumption mode, in a memory device having a non-volatile memory, power supply to almost all circuits in the memory device is stopped. On the other hand, when returning from the sleep mode to the normal mode, it is expected to shorten the returning time as possible after power supply returns in the memory device.

DETAILED DESCRIPTION

According to the present embodiment, a memory device is connectable to a host having a first memory. The memory device includes a second memory and a controller. The second memory is a non-volatile memory. The controller controls the second memory. The controller includes a host communication unit that communicates with the host, a processor, a peripheral circuit, a control register used when the processor controls the peripheral circuit, and a power supply circuit. When shifting from a normal mode to a sleep mode, the processor transmits a first command and saving data to the host, and issues a power shut-off request. The first command is a command for writing data to the first memory. The saving data includes register information. The register information includes register data stored in the control register and an address of the control register. The power supply circuit shuts off power supply to the second memory, the control register, the processor, and the peripheral circuit in response to the issued power shut-off request.

Exemplary embodiments of the memory device and the information processing device will be explained below in detail with reference to the accompanying drawings. The present invention is not limited to the following embodiments.

Embodiment

Figure 1:
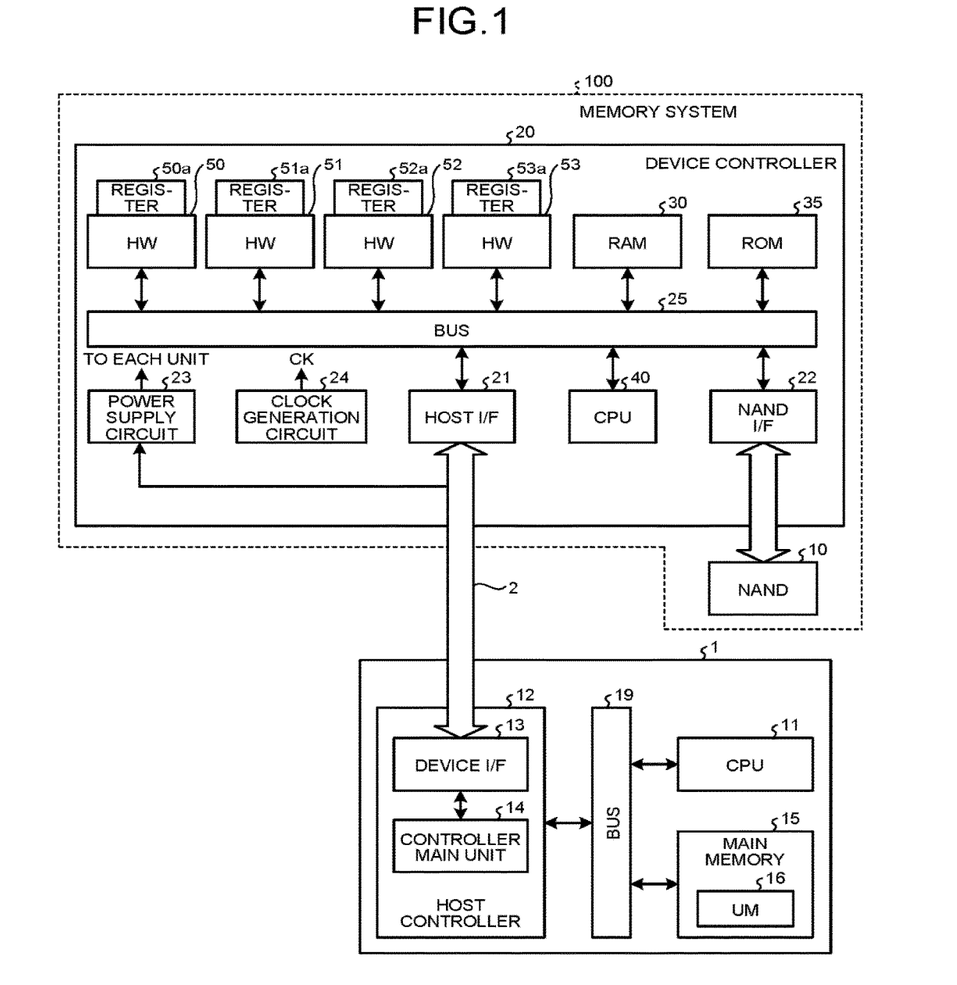
FIG. 1 is a functional block diagram illustrating a configuration example of an information processing device.

FIG. 1 is a block diagram illustrating a configuration example of an information processing device according to an embodiment. The information processing device according to the embodiment includes a host device (hereinafter, shortened to a host) 1 and a memory device (memory system) 100 that functions as an external storage device of the host 1. The host 1 and the memory device 100 support UMA (Unified Memory Architecture) and a memory (a later described main memory 15) included in the host 1 is shared by the host 1 and the memory device 100.

The host 1 and the memory device 100 are connected by a communication path 2. In the memory device 100, a built-in flash memory and an SSD (Solid State Drive) or the like can be applied. The host 1 is a personal computer, a mobile phone, or an imaging device, for example.

<Configuration of Memory Device>

The memory device 100 includes an NAND type flash memory (hereinafter, shortened to NAND) 10 which is a non-volatile memory, and a device controller 20 that executes data transfer with the host 1. The non-volatile memory is not limited to the NAND type flash memory and may be a three-dimensional structure flash memory, an ReRAM (Resistance Random Access Memory), an FeRAM (Ferroelectric Random Access Memory) or the like.

The NAND 10 has one or more memory chips having a memory cell array. The memory cell array has a plurality of memory cells which are arranged in a matrix state. The memory cell array has a plurality of blocks which are units of data erasing. Each block includes a plurality of pages. The page is a minimum unit of reading and writing.

Figure 2:
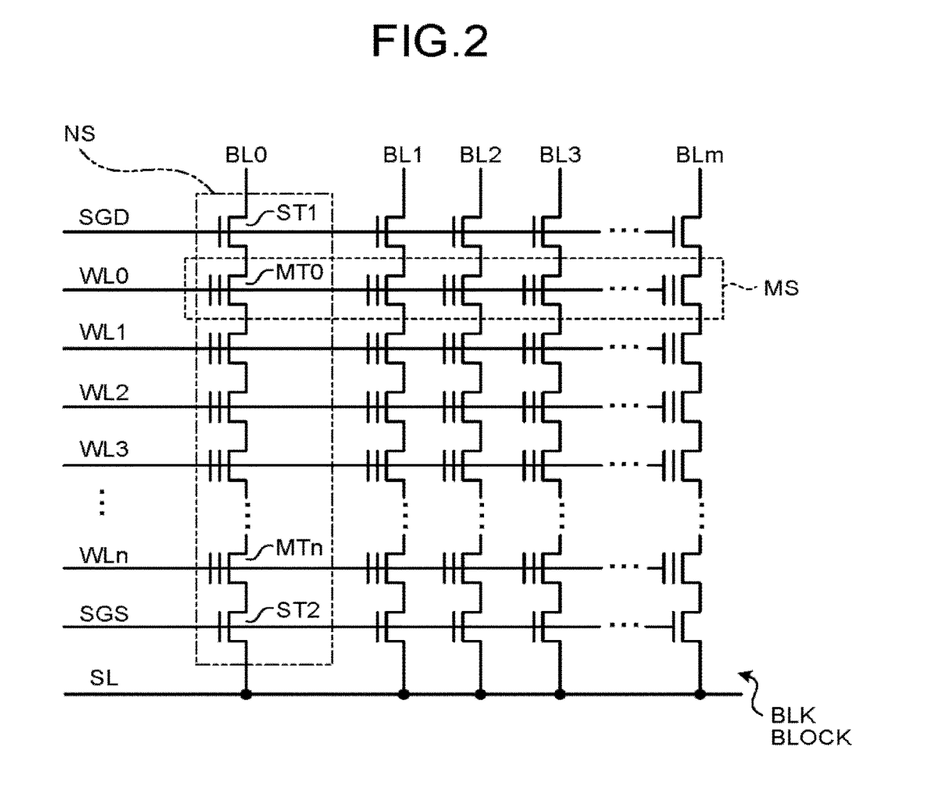
FIG. 2 is a diagram illustrating a configuration example of a block of a memory cell array.

FIG. 2 is a diagram illustrating a configuration example of a block of a memory cell array. FIG. 2 illustrates one block of a plurality of blocks that configure the memory cell array. Other blocks of the memory cell array have the same configuration as FIG. 2. As illustrated in FIG. 2, a block BLK of the memory cell array includes (m+1) NAND strings NS ("m" is an integer number which is equal to or greater than zero). Each NAND string NS has (n+1) memory cell transistors MT0 to MTn ("n" is an integer number which is equal to or greater than zero) which are connected in series sharing a diffusion region (a source region or a drain region) between adjacent memory cell transistor MT, and selection transistors ST1 and ST2 arranged at both ends f the columns of the (n+1) number of memory cell transistors MT0 to MTn.

Word lines WL0 to WLn are respectively connected to control gate electrodes of the memory cell transistors MT0 to MTn configuring the NAND string NS, and the memory cell transistors MTi (i=0 to n) of each NAND string NS are commonly connected by the same word line WLi (i=0 to n). In other words, the control gate electrodes of the memory cell transistors MTi in the same row in the block BLK are connected to the same word line WLi.

Each of the memory cell transistors MT0 to MTn is configured by a field-effect transistor which has a stacked gate structure formed on the semiconductor substrate. Here, the stacked gate structure includes a charge accumulation layer (a floating gate electrode) formed on the semiconductor substrate via a gate insulating film and a control gate electrode formed on the charge accumulation layer via an inter-gate insulating film. In the memory cell transistors MT0 to MTn, a threshold voltage varies according to the number of electrons accumulated to the floating gate electrode and data can be stored according to the difference of the threshold voltages.

Bit lines BL0 to BLm are respectively connected to the drains of (m+1) selection transistors ST1 in one block BLK, and selection gate lines SGD is commonly connected to the gates of the selection transistors. Further, a source of the selection transistor ST1 is connected to a drain of the memory cell transistor MT0. Similarly, a source line SL is commonly connected to the sources of the (m+1) selection transistors ST2 in one block BLK, and a selection gate line SGS is commonly connected to the gates of the selection transistors. Further, a drain of the selection transistor ST2 is connected to a source of the memory cell transistor MTn.

Each memory cell is connected to the word line and connected to the bit line. Each memory cell can be identified by using an address identifying the word line and an address identifying the hit line. As described above, data of the memory cells (memory cell transistors MT) in the same block BLK is collectively erased. On the other hand, data reading and data writing are executed by the page unit including a plurality of memory cells which are commonly connected to any one of the word lines WL.

The NAND 10 stores user data transmitted from the host 1, management information of the memory device 100, and firmware that causes the CPU 40 to serve as a main control unit of the memory device 100.

The device controller 20 includes a host interface (host I/F) 21, an NAND interface (NAND I/F) 22, a power supply circuit 23, a clock generation circuit 24, a RAM 30, a ROM 35, the CPU 40, plural peripheral circuits (HW: Hardware) 50 to 53, and a bus 25 that connects the above.

The host I/F 21 is a connection interface to the communication path 2. The host I/F 21 functions as a host communication unit that communicates with the host. Any communication interface standards such as SATA (Serial Advanced Technology Attachment), SAS (Serial Attached SCSI), and PCIe (PCI Express) can be used as the host I/F 21. The NAND I/F 22 is a connection interface to the NAND 10. The NAND I/F 22 directly controls writing and reading to and from the NAND 10 according to the control of the CPU 40.

The RAM 30 is a volatile semiconductor memory that can be accessed at a speed higher than that of the NAND 10. As the RAM 30, a SRAM (Static Random Access Memory) or a DRAM (Dynamic Random Access Memory) is used. The RAM 30 temporarily stores at least a part of the firmware stored in the NAND 10.

The RAM 30 functions as a buffer that temporarily stores user data received from the host 1 before writing to the NAND 10 and temporarily stores user data read from the NAND 10 before transmitting to the host 1.

The RAM 30 temporarily stores the user data and the management information for managing the memory device 100. The management information managed in the RAM 30 is backed up in the NAND 10. At the time of startup of the memory device 100, the firmware is read from the NAND 10 and loaded to the RAM 30. Then, when initializing the CPU 40, the management information is read from the NAND 10 and loaded to a RAM 30.

The management information includes a logical-to-physical translation table (L2P table), a block management table and the like. In the L2P table, mapping between a logical address used in the host 1 and a physical address of the RAM 30, or mapping between a logical address used in the host 1 and a physical address of the NAND 10 is registered. As the logical address, for example, LBA (Logical Block Addressing) is used. The physical address indicates a memory position of the RAM 30 or the NAND 10 where data is stored. The block management table manages the following information, for example.

number of erasing times for each block usage condition (identification information of an active block or a free block)

identification information of a bad block

An active block is a logical block in which valid data is recorded. A free block is a logical block which does not record valid data and is reusable after erasing. A bad block is a physical block which does not operate correctly because of various reasons and cannot be used.

A booting program which operates when the power is turned on and a returning program which operates when returning from a sleep mode to a normal mode are stored in the ROM (Read Only Memory) 35 as a non-volatile memory. The returning program restores, as described later, saving data saved in the main memory 15 of the host 1 to the memory device 100. The booting program is executed by the CPU 40 when the memory device 100 shifts from a turned-off state to a turned-on state. The CPU 40 executes the booting program and loads a part of the firmware stored in the NAND 10 to the RAM 30. After that, the CPU 40 executes the firmware of the RAM 30 to execute various control according to a request from the host 1.

The CPU 40 as a computation processor and the plurality of peripheral circuits (HW) 50 to 53 are provided in the memory device 100 in order to realize a function of the device controller 20. For example, the HW 50 executes a coding process and a decoding process of an error correction process. The HW 51 executes a data encryption process. The HW 52 and 53 execute control of a DMA (Direct Memory Access).

The HW 50 encodes user data and generates parity. As an encoding method executed by the HW 50, a BCH code, a RS (Reed-Solomon) code or the like can be used, although any code may be used. The HW 50 executes a decoding process based on user data read from the NAND 10 and the parity. The HW 50 has a plurality of control registers 50a that store data used by the CPU 40 to control operation of the HW 50 and information required for operation of the HW 50.

The HW 51 executes an encryption process of user data and management information or the like. The HW 51 has a plurality of control registers 51a that store data used by the CPU 40 to control operation of the HW 51 and information required for operation of the HW 51.

The HW 52 and 53 execute DMA control. The HW 52 and 53 have a plurality of control registers 52a, 53a that store data used by the CPU 40 to control operation of the HW 52 and 53 and information required for operation of the HW 52 and 53.

An address to identify each control register is allocated to each of the control registers 50a to 53a. The control registers 50a to 53a are volatile memories.

The CPU 40 is a main control unit of the memory device 100 and totally controls respective components of the memory device 100. The function of the CPU 40 is realized by one or more CPUs. The function of the CPU 40 is realized by executing firmware loaded to the RAM 30, the returning program stored in the ROM 35 or the like. When a command is received from the host 1 via the host I/F 21, the CPU 40 executes control according to the command. For example, when a write request is received from the host 1, the CPU 40 controls the HW 51 so that data is transferred between the main memory 15 of the host 1 and the RAM 30. The CPU 40 instructs the HW 50 to encode write data transferred to the RAM 30. Further, the CPU 40 instructs the NAND I/F 22 to write a code word (data and parity) generated by the HW 50 to the NAND 10. Based on the writing, the CPU 40 updates the management information managed in the RAM 30.

Further, when a read request is received from the host 1, the CPU 40 instructs the NAND I/F 22 to read the code word (user data and parity) from the NAND 10 based on the management information managed in the RAM 30. Further, the CPU 40 instructs the HW 50 to decode the code word read from the NAND 10. With this, the data read from the NAND 10 is transferred to the HW 50 via the NAND I/F 22. The read data decoded by the HW 50 is buffered in the RAM 30. Further, the CPU 40 controls the host I/F 21 and the HW 51 to execute data transfer between the main memory 15 of the host 1 and the RAM 30 and transmits the decoded user data to the host 1.

In this manner, the CPU 40 executes read and write control from and to the NAND 10, management information update control, error correction process control, encryption process control, or the like. In addition to the above, the CPU 40 executes garbage collection control, wear leveling control, control for storing management information managed in the RAM 30 to the NAND 10, or the like.

Direct-current power source supplied from the host 1 via the communication path 2 is input to the power supply circuit 23. The power supply circuit 23 generates plural internal direct current power sources having different voltages from the external direct current power source and supplies the internal direct current power sources to each unit in the memory device 100 via internal power source lines. Further, the power supply circuit 23 detects rising and falling of the external power source, generates a power-on reset signal or a power-off reset signal to supply to the CPU 40 or the like. The power supply circuit 23 may have an internal power source.

In a sleep mode, the power supply circuit 23 can supply internal power source voltage to a part of the host I/F 21 and a part of the control registers and shut off the power supply to other circuits.

The clock generation circuit 24 supplies a clock signal ck to various circuits in the memory device 100. In the sleep mode, the clock generation circuit can supply clock signals to a part of the host I/F 21 and a part of the control registers and shut off the supply of the clock signals to other circuits.

The memory device 100 has two states: a normal mode in which normal operation can be executed and a sleep mode as an energy-saving standby power mode. In the present embodiment, the time required to return from the sleep mode to the normal mode can be shortened by saving register information of the control registers 50a to 53a to the main memory 15 of the host 1 before shifting from the normal mode to the sleep mode.

<Configuration of Host>

The host 1 includes a CPU 11 that executes an operating system (OS) or a user program, a host controller 12, and the main memory 15. The CPU 11, the main memory 15 and the host controller 12 are connected to one another via a bus 19.

The main memory 15 is configured of a DRAM for example. In addition to an area that the host 1 uses, the main memory 15 has a device usage region (hereinafter, abbreviated as Unified Memory: UM) 16 which is allocated to various devices connected to the host 1. One of the various devices connected to the host 1 is the memory device 100. The UM 16 is used as an information saving region of the memory device 100 in the sleep mode.

The host controller 12 includes a device I/F 13 which is a connection interface to the communication path 2, and a controller main unit 14. The controller main unit 14 transfers data or a command with the main memory 15 or the CPU 11 via the bus 19. Further, the controller main unit 14 transfers data (including a command) with the memory device 100 via the device I/F 13.

Next, referring to FIG. 3, an operation example of the information processing device in a case that the memory device 100 transmits saving data to the host device 1 will be explained. For example, when the memory device 100 shifts from the normal mode to the sleep mode, the memory device 100 transmits saving data to the host device 1.

[Step S1202]

The CPU 40 of the memory device 100 generates a command (Access UM Buffer) for writing saving data to the UM 16. This command (Access UM Buffer) includes a write command, an address to where the saving data is to be written, and information of data size of the saving data and the like. The CPU 40 transmits this command (Access UM Buffer) to the host controller 12 via the host I/F 21.

[Step S1203]

After that, the CPU 40 transmits saving data (UM DATA IN) to the host controller 12 via the host I/F 21. When the command (Access UM Buffer) for write data is received from the memory device 100, the host controller 12 receives the saving data (UM DATA IN) from the memory device 100 according to the command.

[Step S1204]

The host controller 12 stores the saving data (UM DATA IN) received from the memory device 100 the UM 16 of the main memory 15.

[Step S1205]

When the saving data is stored in the UM 16, the host controller 12 transmits a response command (Acknowledge UM Buffer) that indicates that the writing is completed to the memory device 100. With this, the memory device 100 completes the data writing to the host device 1.

Figure 4:
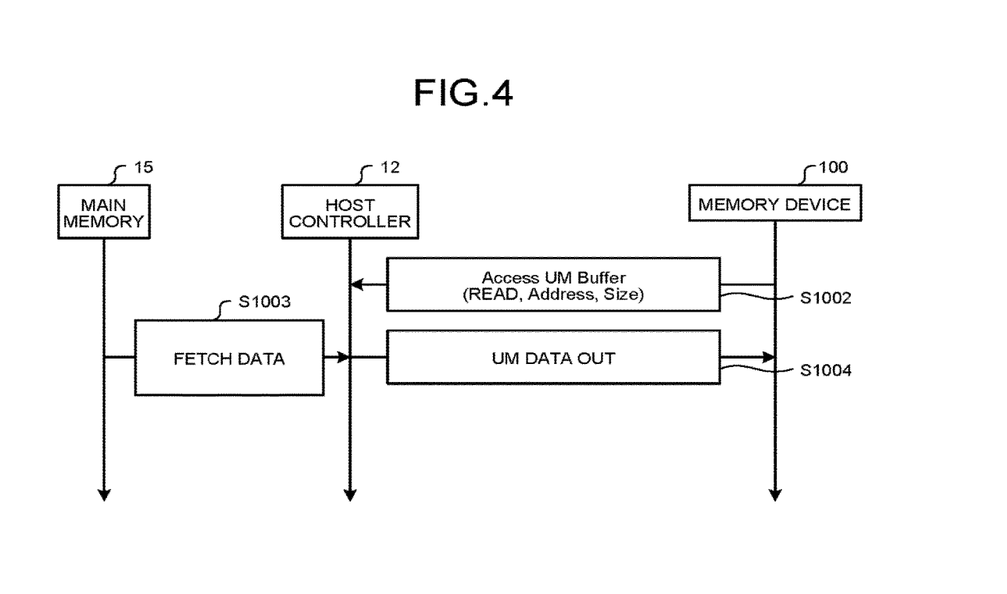
FIG. 4 is a diagram illustrating operation that the memory device restores the saving data from the host device.

Next, referring to FIG. 4, an operation example of the information processing device in a case that the memory device 100 reads data from the host device 1 will be explained. For example, when the memory device 100 returns to the normal mode from the sleep mode, the memory device 100 reads saving data from the host device 1.

[Step S1002]

The CPU 40 of the memory device 100 generates a command (Access UM Buffer) for fetching (reading) the saving data from the UM 16. The command (Access UM Buffer) includes a read command, an address from where the saying data is be read, and information of data size of the saving data or the like. The CPU 40 transmits the command (Access UM Buffer) to the host controller 12 via the host I/F 21.

[Step S1003]

When the command (Access UM Buffer) for reading data is received from the memory device 100, the host controller 12 fetches the saving data from the UM 16 of the main memory 15 according to the command.

[Step S1004]

The host controller 12 transfers the fetched saving data to the memory device 100 (UM DATA OUT). The memory device 100 receives the saving data transmitted from the host controller 12.

Figure 5:
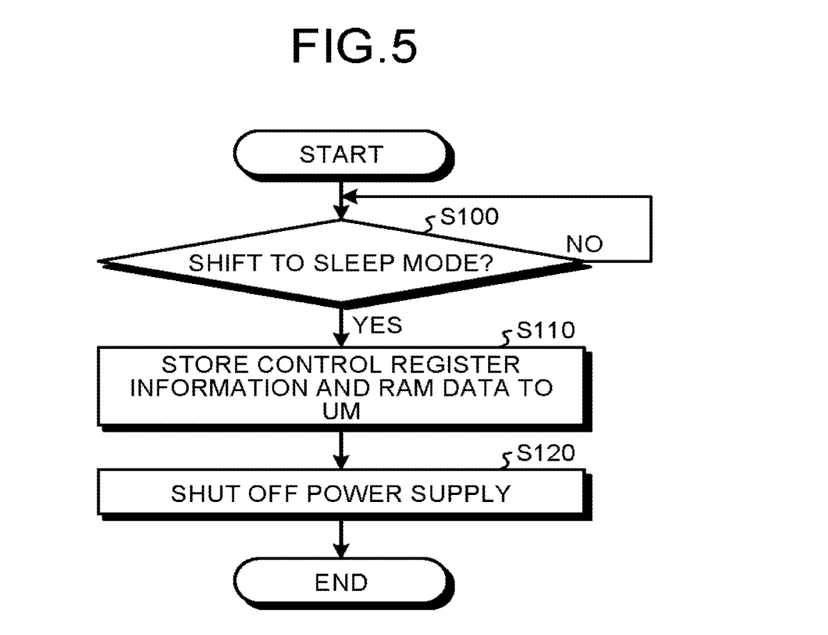
FIG. 5 is a flowchart illustrating an operation example of the memory device when shifting to a sleep mode.

FIG. 5 is a flowchart illustrating an operation process of the memory device 100 in a case of shifting to the sleep mode. The CPU 40 determines whether or not shift to the sleep mode (step S100). The shifting to the sleep mode may be executed based on a request from the host 1 as illustrated in FIG. 6 or may be executed by the memory device 100 independently as illustrated in FIG. 7.

Figure 6:
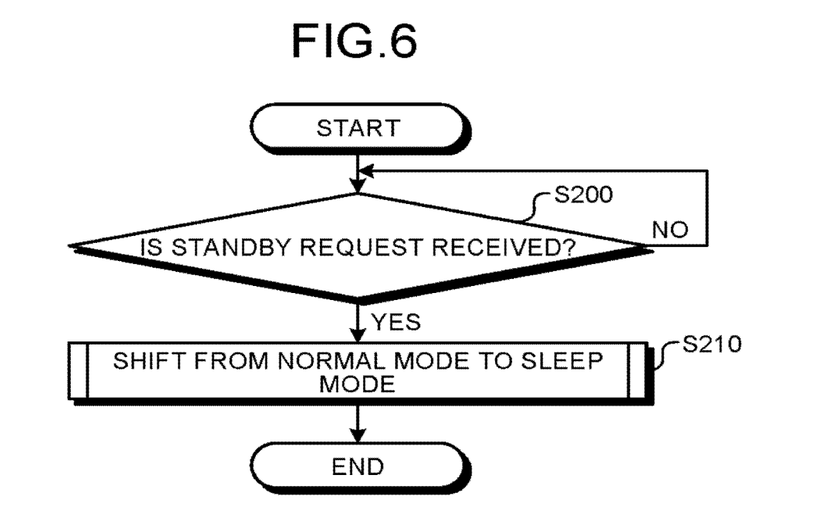
FIG. 6 is a flowchart illustrating an example of a condition to shift to the sleep mode.

In FIG. 6, when a shifting request (standby request) to a low power consumption mode is received from the host 1 (step S200), the host I/F 21 notifies the standby request to the CPU 40. When the standby request is notified, the CPU 40 executes a shifting process from the normal mode to the sleep mode (step S210).

Figure 7:
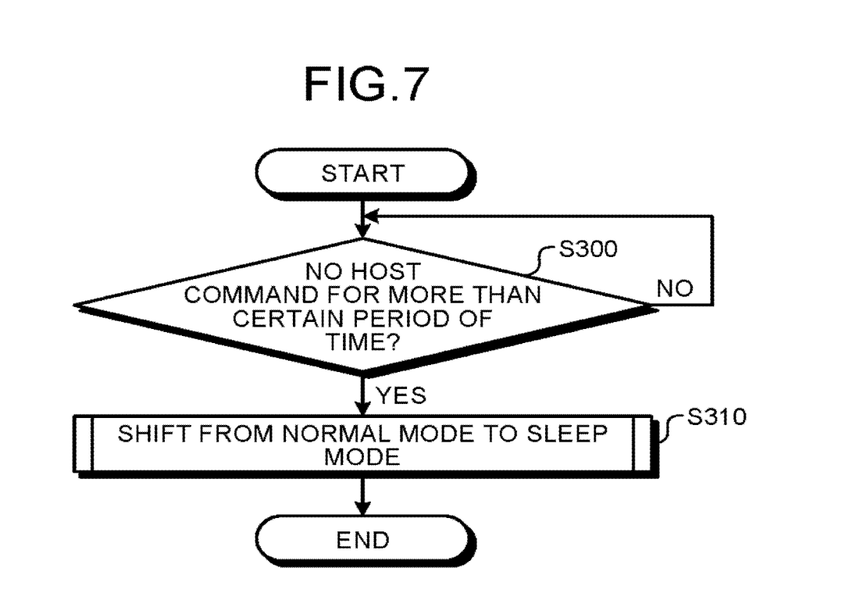
FIG. 7 is a flowchart illustrating an example of a condition to shift to the sleep mode.

In FIG. 7, the host I/F 21 monitors a command from the host 1 (step S300) and, when it is detected that a command from the host 1 has not received for more than a certain period of time (step S300: Yes), the host I/F 21 executes a shifting process from the normal mode to sleep mode (step S310).

Figure 3:
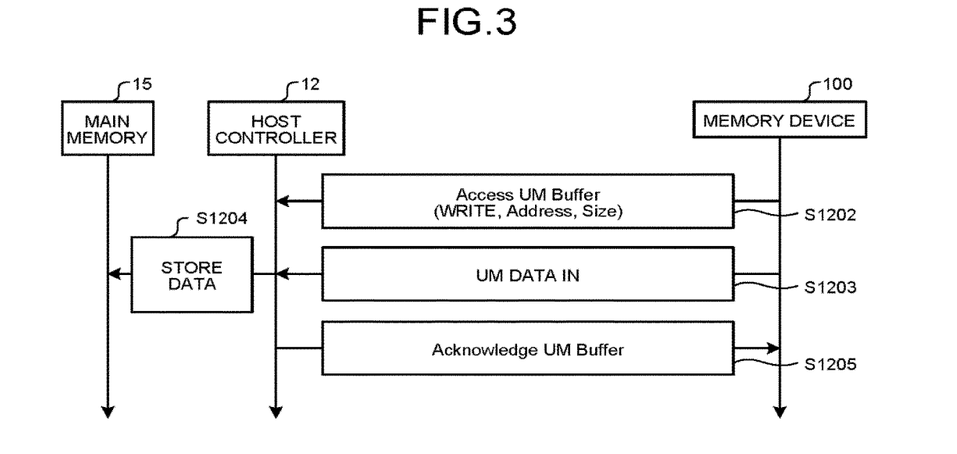
FIG. 3 is a diagram illustrating operation that a memory device transmits saving data to a host device.

The CPU 40 saves control register information and RAM data which is the information stored in the RAM 30 to the UM 16 of the host 1 before shifting to the sleep mode, according to the procedure illustrated in FIG. 3 (FIG. 5: step S110).

The control register information includes register data (a register value) buffered in the plurality of control registers 50a to 53a, a register address, a time stamp that indicates the time when the saving is executed. One value is set to the time stamp when saving is executed. The time stamp is stored in a register to which power is supplied even during the sleep mode. The RAM data includes a part of the firmware loaded from the NAND 10 to the RAM 30 and management information. When user data is buffered in the RAM 30, the CPU 40 saves the user data to the NAND 10.

When the saving process of the saving data to the UM 16 and the saving process of the user data to the NAND 10 are finished, the CPU 40 stores the activating program selection information in a register to which power is supplied even during the sleep mode. The activating program selection information is information that indicates whether the booting program or the returning program is operated by the CPU 40 when the power is turned on subsequently. In this case, activating program selection information indicating to activating by the returning program is stored in the register.

Further, the CPU 40 issues a power shut-off ready request to the power supply circuit 23 and the clock generation circuit 24 (step S120). The power shut-off ready request is a request to shut off power supply or clock supply to specified circuits before the CPU 40 shifts to the sleep mode. With this, power is supplied to the part of the host I/F 21, the power supply circuit 23 and the clock generation circuit 24 and power supply is shut off to the CPU 40, the RAM 30, the ROM 35, the NAND I/F 22, the HW 50 to 53 and the control registers 50a to 53a in the device controller 20. Further, clock supply is continued to the part of the host I/F and the part of the control registers and clock supply to other circuits is shut off.

The host controller 12 of the host 1 stores the saving data (register information, firmware, management information, and the time stamp), which is transmitted from the memory device 100, in the UM 16 of the main memory 15.

Figure 8:
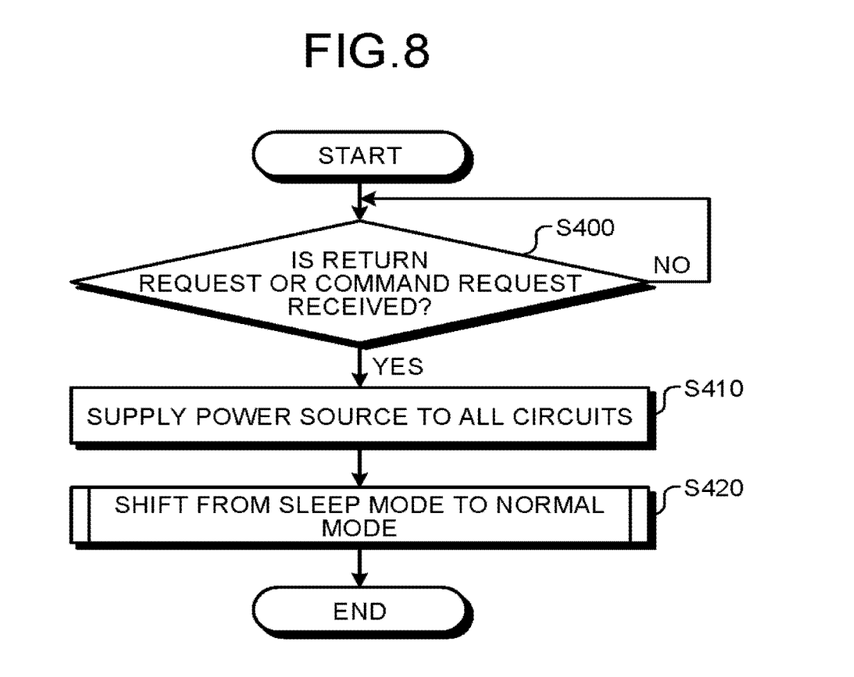
FIG. 8 is a flowchart illustrating an operation example of the memory device when returning to the normal mode.
Figure 9:
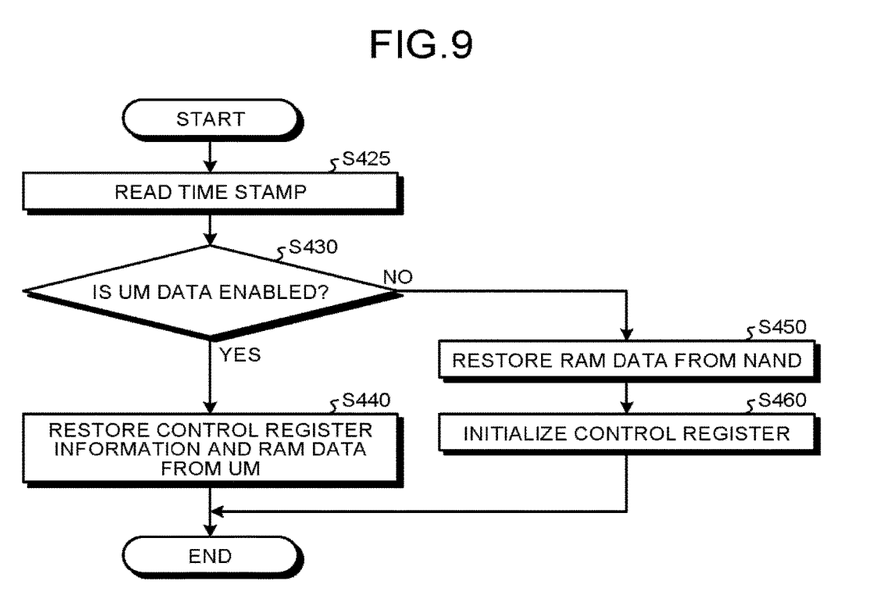
FIG. 9 is a flowchart illustrating an operation example of the memory device when returning to the normal mode.

FIGS. 8 and 9 are flowcharts illustrating operation procedures of the memory device 100 in a case of returning from the sleep mode to the normal mode. FIG. 8 illustrates operation procedures of the host I/F 21 and the power supply circuit 23. FIG. 9 illustrates an operation procedure of the CPU 40. When return request to normal mode or a command is received from the host 1 during the sleep mode (FIG. 8: step S400), the host I/F 21 issues a return request to the power supply circuit 23 and the clock generation circuit 24. When the return request is received, the power supply circuit 23 supplies power to all the circuits in the memory device 100 (step S410). In other words, the power supply circuit 23 restarts power supply to the CPU 40, the ROM 35, the RAM 30, the NAND I/F 22, the HW 50 to 53, and the control registers 50a to 53a in the device controller 20 to which power supply has been shut off. Further, the clock generation circuit 24 restarts clock supply to all the circuits in the device controller 20. Further, the host I/F 21 notifies to the CPU 40 that the return request or the command is received from the host 1. Based on this notification, the CPU 40 is activated and executes a following process of shifting from the sleep mode to the normal mode (step S420).

After activated, the CPU 40 refers to the activating program selection information stored in the register and executes the returning program stored in the ROM 35. The CPU 40 requests the host 1 to transmit a time stamp in the saving data stored in the UM 16 to the memory device 100 (FIG. 9: step S425). In response to this request, the host controller 12 reads the time stamp from the UM 16 and transmits the read saving data to the memory device 100. When the time stamp is received via the host I/F 21, the CPU 40 compares the time stamp stored in the register with the time stamp in the saving data read by the UM 16. The CPU 40 determines whether a difference between the two time stamps is within a certain period of time (step S430) and, when it is within the certain period of time, the CPU 40 determines that the saving data stored in the UM 16 is enabled.

When determining that the data stored in the UN 16 is enabled (step S430: Yes), the CPU 40 requests the host 1 to transmit control register information and RAM data stored in the UM 16 to the memory device 100 according to the procedure illustrated in FIG. 4. The RAM data stored in the UM 16 is saving data that the CPU 40 stores in the UM 16 of the host 1 before shifting to the sleep mode and includes a part of the firmware and management information. In response to this request, the host controller 12 reads the control register information and the RAM data from the UM 16 and transmits the read control register information and RAM data to the memory device 100. When the control register information and the RAM data are received, CPU 40 restores the register data in the respective control registers 50a to 53a based on the register addresses in the control register information. Further, the CPU 40 restores the received RAM data in the RAM 30 (S440). Further, the CPU 40 loads, from the NAND 10 to the RAM 30, the user data buffered in the RAM 30 before shifting to the sleep mode. With this, the memory device 100 can return to a condition before shifting to the sleep mode. After that, the CPU 40 executes the firmware restored in the RAM 30. After that, the memory device 100 operates in response to a request from the host 1.

In the above explanation, a time stamp is previously received front the host 1 and control register information and RAM data are received based on a comparison result of the time stamps; however, the time stamp, control register information and RAM data may be received at once.

On the other hand, when the CPU 40 determines that the data stored in the UM 16 is not enabled (step S430: No), the CPU 40 reloads, from the NAND 10 to the RAM 30, the firmware and management information which are RAM data (step S450). In other words, the CPU 40 reloads the firmware from the NAND 10 to the RAM 30 and executes the reloaded firmware. Next, the CPU 40 reloads the management information from the NAND 10 to the RAM 30.

Next, the CPU 40 initializes the control registers 50*a* to 53*a* (step S460). In this manner, when it is determined that the data stored in the UM 16 is not enabled, operation starts in an initial condition similarly to the case of being activated by the booting program.

In this manner, in the memory device according to the embodiment, when shifting to the sleep mode, a register value of the control register and an address of the control register are saved in the UM 16 of the host 1 so that the returning process time from the sleep mode to the normal mode can be shortened compared to a case of saving the information in the NAND 10. Further, when shifting to the sleep mode, since the register value of the control register and the address of the control register are not written to the NAND 10, the number of access to the NAND 10 can be reduced and this can extend the length of the life of the NAND 10.

Further, according to the embodiment, when the control register information is saved in the UM 16, since the time stamp is included in the saving data, it becomes possible to accurately determine whether the saving data is valid or not when returning to the normal mode.

Further, according to the embodiment, the firmware and management information loaded to the RAM are to be saved in the UM 16 and this shortens the returning process time from the sleep mode to the normal mode, compared to a case of saving the firmware and the management information in the NAND 10. Further, when shifting to the sleep mode, since the firmware and management information loaded to the RAM are not written to the NAND 10, the number of access to the NAND 10 can be reduced and this expands the length of life of the NAND 10.

By the way, according to the above embodiment, when shifting to the sleep mode, the control register information of the control register and the RAM data (the firmware and the management information) stored in the RAM 30 are saved in the UM 16; however, only the control register information of the control register may be saved in the UM 16. Further, when shifting to the sleep mode, the user data stored in the RAM 30 may also be saved in the UM 16. Further, according to the above embodiment, the firmware is stored in the NAND 10; however, the firmware may be stored in the ROM 35.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device connectable to a host having a first memory, the memory device comprising:

a second memory which is a non-volatile memory; and
a controller that controls the second memory and comprises a first control register, the controller being configured to:
when shifting from a normal mode to a sleep mode, store time information to the first control register to which internal power is supplied in the sleep mode, transmit a first command and first data to the host, the first command being a command for writing data to the first memory, the first data including the time information;
when returning from the sleep mode to the normal mode, transmit, to the host, a second command which is a request for reading the first data stored in the first memory;
receive second data from the host, the second data being data transmitted in response to the second command by the host;
compare the time information included in the received second data with the time information stored in the first control register; and
determine whether or not the second data is valid based on the comparison result.

2. The memory device according to claim 1, wherein
the controller comprises a processor, a peripheral circuit, a second control register to which the internal power is not supplied in the sleep mode, the second control register being used when the processor controls the peripheral circuit,
the first data includes register information of the second control register, the register information including register data stored in the second control register and an address of the second control register, and
the processor restores register data included in the received second data when it is determined that the second data is valid.

3. The memory device according to claim 2, further comprising a third memory which is a volatile memory, wherein
when it is determined that the second data is not valid, the processor initializes the second control register after loading firmware to the third memory.

4. The memory device according to claim 1, wherein the controller shifts from the normal mode to the sleep mode in response to a request from the host.

5. The memory device according to claim 1, wherein the controller shifts from the normal mode to the sleep mode when a command is not received from the host for more than a certain period of time.

6. The memory device according to claim 1, further comprising a third memory which is a volatile memory, wherein
the first data further includes firmware stored in the third memory, and
the controller restores the firmware included in the received second data in the third memory.

7. The memory device according to claim 1, further comprising a third memory which is a volatile memory, wherein
the first data further includes management information stored in the third memory, and
the controller restores the management information included in the received second data in the third memory.

8. An information processing device comprising:
a host having a first memory; and a memory device connectable to the host, the memory device comprising:

a second memory which is a non-volatile memory; and a controller that controls the second memory and comprises a first control register, the controller being configured to:

when shifting from a normal mode to a sleep mode, store time information to the first control register to which internal power is supplied in the sleep mode, transmit a first command and first data to the host, the first command being a command for writing data to the first memory, the first data including the time information;

when returning from the sleep mode to the normal mode, transmit, to the host, a second command which is a request for reading the first data stored in the first memory;

receive second data from the host, the second data being data transmitted in response to the second command by the host;

compare the time information included in the received second data with the time information stored in the first control register; and determine whether or not the second data is valid based on the comparison result.

9. The information processing device according to claim 8, wherein the controller comprises a processor, a peripheral circuit, a second control register to which the internal power is not supplied in the sleep mode, the second control register being used when the processor controls the peripheral circuit, the first data includes register information of the second control register, the register information including register data stored in the second control register and an address of the second control register, and the processor restores register data included in the received second data when it is determined that the second data is valid.

10. The information processing device according to claim 9, the memory device further comprising a third memory which is a volatile memory, wherein when it is determined that the second data is not valid, the processor initializes the second control register after loading firmware to the third memory.

11. The information processing device according to claim 8, wherein the controller shifts from the normal mode to the sleep mode in response to a request from the host.

12. The information processing device according to claim 8, wherein the controller shifts from the normal mode to the sleep mode when a command is not received from the host for more than a certain period of time.

13. The information processing device according to claim 8, the memory device further comprising a third memory which is a volatile memory, wherein the first data further includes firmware stored in the third memory, and the controller restores the firmware included in the received second data in the third memory.

14. The information processing device according to claim 8, the memory device further comprising a third memory which is a volatile memory, wherein the first data further includes management information stored in the third memory, and the controller restores the management information included in the received second data in the third memory.

15. The memory device according to claim 2, further comprising a power supply circuit, wherein the power supply circuit is configured to generate the internal power from power supplied from the host.

16. The information processing device according to claim 9, the memory device further comprising a power supply circuit, wherein the power supply circuit is configured to generate the internal power from power supplied from the host.

* * * * *